United States Patent [19]

Schindler et al.

[11] Patent Number: 4,825,346
[45] Date of Patent: Apr. 25, 1989

[54] LIGHT COVER, ESPECIALLY A PLATE-SHAPED OR BOWL-SHAPED LAMP COVER

[75] Inventors: Horst Schindler, Dornstetten; Adriaan A. Reekers, Freudenstadt, both of Fed. Rep. of Germany

[73] Assignee: Norddeutsche Seekabelwerke Aktiengesellschaft, Nordenham, Fed. Rep. of Germany

[21] Appl. No.: 938,918

[22] Filed: Dec. 8, 1986

[30] Foreign Application Priority Data

Dec. 7, 1985 [DE] Fed. Rep. of Germany ....... 3543292

[51] Int. Cl.⁴ .............................................. F21V 3/00
[52] U.S. Cl. .................................... 362/311; 362/268; 264/321; 428/36.5

[58] Field of Search ............... 362/311, 326, 330, 336, 362/317, 331, 268; 428/35, 316.6, 314.2, 314.4, 314.8; 264/321, 1.7, 1.9, 171

[56] References Cited

U.S. PATENT DOCUMENTS

| 2,928,131 | 3/1960 | Mahler | 264/1.7 |
| 3,458,248 | 7/1969 | Eversole | 264/321 |
| 3,589,592 | 6/1971 | Tigner | 264/321 |
| 3,993,810 | 11/1976 | Bonis | 428/35 |
| 4,312,028 | 11/1982 | Hamacher | 362/306 |

Primary Examiner—Ira S. Lazarus
Assistant Examiner—D. M. Cox
Attorney, Agent, or Firm—Sughrue, Mion, Zinn, Macpeak, and Seas

[57] ABSTRACT

Light cover (10), especially a plate-shaped or bowl-shaped lamp cover made of transparent material, at least one layer (11) being produced from light-transmitting foamed material.

13 Claims, 2 Drawing Sheets

LIGHT COVER, ESPECIALLY A PLATE-SHAPED OR BOWL-SHAPED LAMP COVER

DESCRIPTION

The invention relates to a light cover, especially a plate-shaped or bowl-shaped lamp cover made of transparent material.

Light covers of this type are known. They serve primarily for encasing or covering light sources in order to scatter the light emitted by a light source and thus make is easier on the human eye or reduce the dazzle effect of the light. For this purpose, in the known light covers, pigments are introduced into the transparent material. The pigments make is possible to scatter the incident light diffusely and thereby lessen the dazzle effect. A disadvantage of this, however, is that the light efficiency of a light source covered in this way is greatly reduced. The pigments not only reflect the light, but also absorb some of the incident radiation. The light cover heats up correspondingly and the light source has to be made larger. Another serious disadvantage is that an additional material, in particular pigments, has to be admixed with a material for a light cover. The production costs increase accordingly.

The object of the present invention is, therefore, to provide a light cover which quarantees a high degree of scattering, whilst at the same time ensuring a high light efficiency. The object of the present invention is also to make it possible to obtain an economical production.

According to the invention, the object is achieved when at least one layer of the light cover consists of light-transmitting foamed material.

The macrostructure of a foamed material is recognizable as a plurality of more or less irregular as bubbles. The invention is based on the knowledge that the bubbles in or on a light cover cause refraction of the incident light, because the light rays are reflected or diffracted on the surfaces of the bubbles, depending on the angle of incidence. The light emerging on the side facing away from the light source is consequently highly diffuse and correspondingly non-dazzling. Surprisingly, this effect is achieved even though the foamed material has a high light-transmitting capacity and, in particular, is not enriched with particles impervious to light, namely pigments. Because of the high light efficiency, the light cover heats up to a lesser extent and the light source itself can be made smaller. Moreover, the production costs are reduced because there is no need for colour pigments.

In an advantageous development of the invention, the light cover has several layers which are joined firmly to one another and of which at least one is designed as a carrier layer consisting of rigid light-transmitting, especially supertransparent material and another is designed as a foamed light distribution layer. In a laminated structure of this type, the carrier layer performs the supporting function. The light distribution layer can therefore be kept very thin, in order thereby to increase even further the effect of high light efficiency. In addition to the carrier layer, further layers can be joined to the existing layers for various purposes. For example, a further layer with a surface specially profiled for decorative purposes is advantageous.

According to the invention, the light distribution layer advantageously has a plurality of bubbles in a middle region between its outer faces, and moreover regions adjacent to the outer faces are made virtually bubble-free and each with a thickness of 0.05 to 0.1 mm. Since the outer faces of the light distribution layer are made bubble-free and therefore smooth, it is guaranteed that they will be easy to clean. It is likewise easily possible for a further layer also having a smooth outer face to be joined to the light distribution layer.

Preferably, the bubbles in the light distribution layer are made elongate and flat and have a length of 0.5 to 2.0 mm, a width of 0.1 to 0.3 mm and an average height of approximately 0.05 mm. At the same time, the longitudinal side of the bubbles is directed essentially parallel to the longitudinal extent of the light distribution layer. The bubbles should be as small as possible to guarantee high diffusion of the incident light rays.

The light distribution layer should be made thin to avoid needlessly reducing the existing high light efficiency. Furthermore, a thin flexible layer is easier to process during production than a thick rigid layer. In the invention, the light distribution layer consequently has a thickness of 0.5 to 0.8 mm.

In a preferred embodiment, the light distribution layer consists of foamed polystyrene. Polystyrene can be extruded easily and can therefore be handled without difficulty during production. Moreover, foamed polystyrene can easily be manufactured by using azodicarbonamides in conjunction with pure polystyrene.

In a preferred embodiment, the carrier layer is arranged on the side of the light cover facing away from a light source and the light distribution layer is arranged on the side facing the light source. The carrier layer and/or possibly also other layers can thus protect the light distribution layer against disturbing influences, for example mechanical or caused by weather conditions.

A particular effect is obtained if the carrier layer is roughened or profiled on its surface facing away from the light source. A further layer possibly provided specially for decorative purposes can be saved as a result of this measure.

Advantageously, the carrier layer and/or further layers consist of preferably transparent polystyrene. Polystyrene can be extruded without difficulty and can easily be joined by means of pressure and the supply of a small amount of heat to a light distribution layer which is likewise produced from plastic.

For reasons of weight in particular, the light cover advantageously has a total thickness of approximately 3 to 6 mm. Moreover, a sufficient strength and therefore mechanical load-bearing capacity of the light cover are guaranteed at this thickness.

The process according to the invention for producing a light cover involves extruding a plastic containing a blowing agent and rolling it out or calendering it into a thin sheet-like structure (light distribution layer), and extruding a further thin layer free of blowing agent (carrier layer) and coating it onto the sheet-like structure (light distribution layer), the latter being at a temperature below the glass transition point, and joining it to this by means of rollers, especially nip rollers, and subsequently calendering it. During calendering, fine bubbles which align themselves in the rolling direction form in the light distribution layer. The nip-rolling of the carrier layer with the light distribution layer guarantees an especially intimate connection between these two layers. Any variation in the thickness of the light distribution layer and in the shape of the bubbles is avoided since the light distribution layer is processed at a temperature below the glass temperature.

The apparatus according to the invention for carrying out the process has a first extruder which is assigned to a rolling arrangement, in such a way that the rolling arrangement is fed by the first extruder, the rolling arrangement being equipped with a pair of nip rollers which follows the first extruder, as seen in the running direction of the rolling arrangement, and there is at least one further extruder which feeds the pair of nip rollers.

Further advantageous embodiments of the idea of the invention can be taken from the sub-claims.

An exemplary embodiment of the light cover and of an apparatus for producing the light cover are explained in detail below with reference to the drawings in which.

Figure 1:
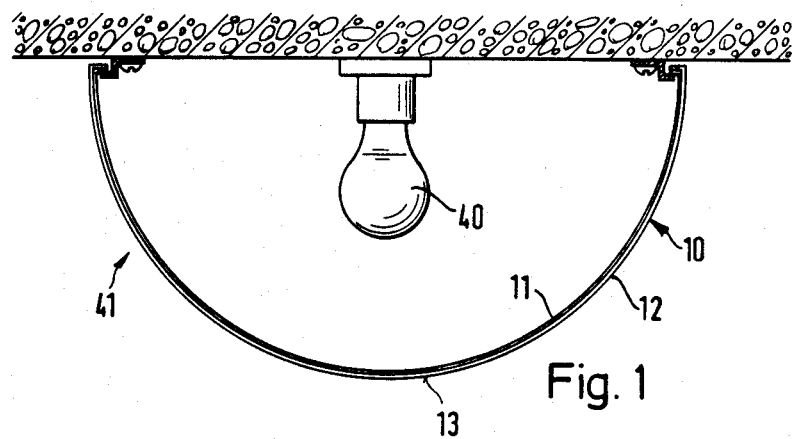
FIG. 1 shows, in cross-section, a bowl-shaped light cover under a light source.

According to FIG. 1, a light source 40 arranged on a ceiling, wall or the like is equipped with a light cover 10. The light cover 10 is made bowl-shaped or in the form of a spherical cup and essentially covers the light emission range of the light source 40. The light source 40 and the light cover 10 together form a lamp 41. There are no limits to the outer shape of the light cover 10. The light cover 10 can be composed of plain or spherical surface portions of any shape. In another embodiment not shown here, the lamp 41 is not arranged directly on the wall, ceiling or the like, but is designed as a standard lamp or pendant lamp.

Figure 2:
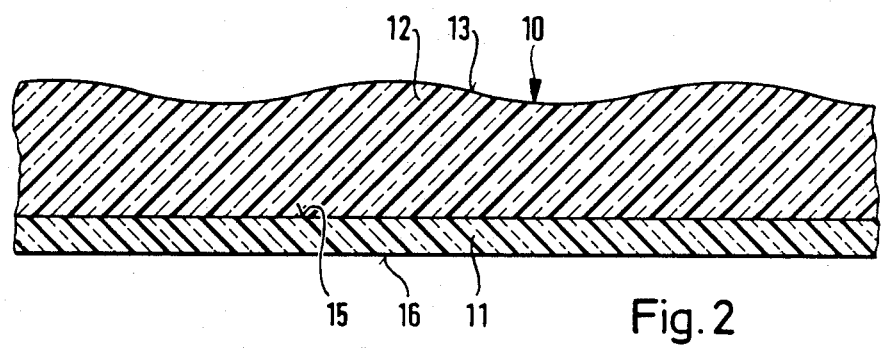
FIG. 2 shows, in cross-section, a cut-out from a light cover on an enlarged scale.

According to FIG. 2, the light cover 10 is composed of two layers, in particular a light distribution layer 11 and a carrier layer 12. The two layers are connected intimately to one another. The light distribution layer 11 is thin in comparison with the carrier layer 12 and has a thickness of 0.5 to 0.8 mm in particular. In contrast to this, the carrier layer 12 here has a thickness of 2.5 to 5.5 mm in particular. The total thickness of the light cover 10 is obtained from the sum of the component layers. The carrier layer 12 is roughened or profiled on its surface 13. The peak-to-valley height or profile depth of the surface 13 is 0.5 to 2.5 mm. The carrier layer 12 is produced from plastic, preferably from transparent polystyrene.

When the cover is fitted on the lamp 41, the light distribution layer 11 faces the light source 40. The light distribution layer 11 is likewise produced from plastic, preferably from polystyrene, to which a blowing agent has been added. Azodicarbonamides with a particular size of especially 5 μm are particularly suitable as blowing agents.

Figure 3:
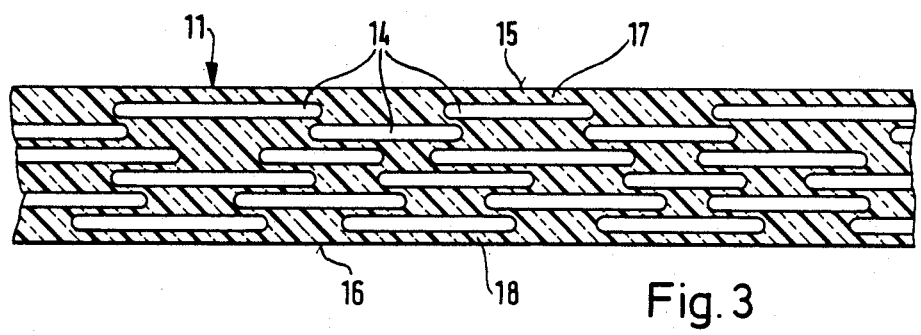
FIG. 3 shows, in cross-section, a cut-out from a foamed light distribution layer on a further-enlarged scale.

FIG. 3 shows the foamed structure of the light distribution layer 11. The bubbles 14 are obtained as a result of the addition of the blowing agent. It is possible to add a blowing agent of a different particle size, but this will produce a different foam structure. The bubbles 14 preferably have a length of 0.5 to 2.0 mm, a width of 0.1 to 0.3 mm and an average height of approximately 0.05 mm. Regions 17 and 18 limited by outer faces 15 and 16 are made virtually bubble-free and each with a thickness of 0.05 to 0.1 mm.

Light covers with more than two layers are also possible. Thus, for example, a decorative layer can also be arranged on the surface 13 of the carrier layer 12. In the exemplary embodiment illustrated here (FIG. 2), the surface 13 of the carrier layer 12 is profiled or roughened and thereby at the same time performs decorative functions.

Figure 4:
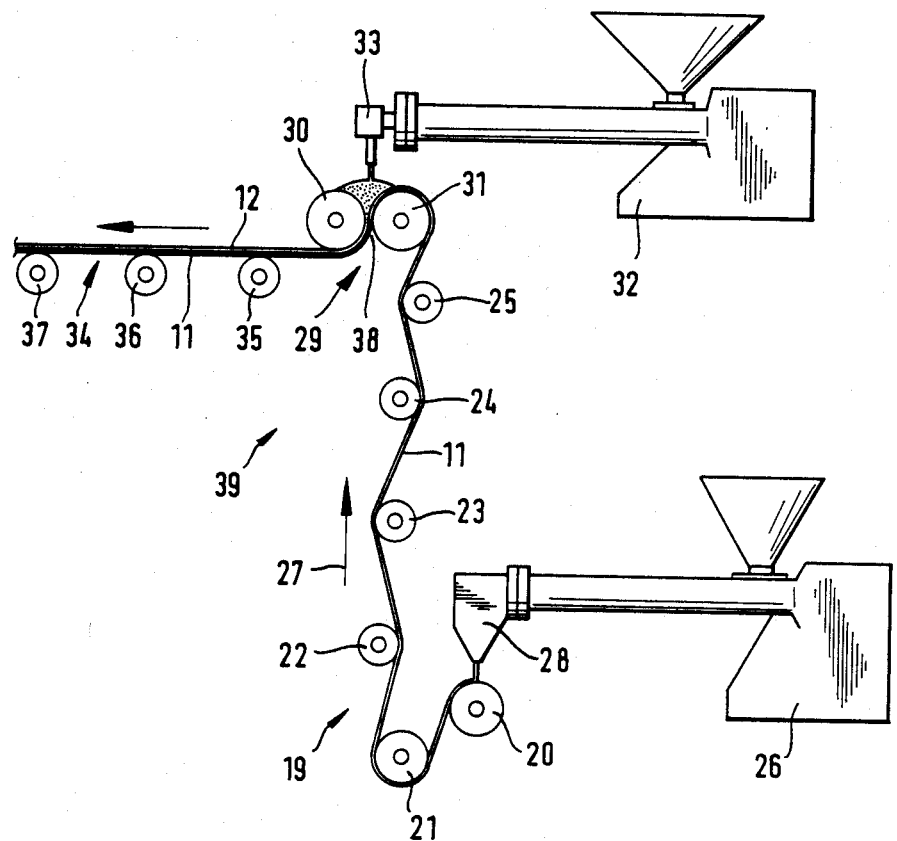
FIG. 4 shows a greatly simplified representation of an apparatus for producing the light cover.

An apparatus for producing the light cover 10 can be seen in FIG. 4. A cooling-roller and smoothing-roller calender 19 with the rollers 20, 21, 22, 23, 24 and 25 is fed by an extruder 26. The extrudate (the light distribution layer 11) is conveyed in the direction of the arrow 27. The extruder 26 is advantageously equipped with a sheet die 28, the dimensions of which match the width of the roller 20. A pair of nip rollers 29 with the rollers 30 and 31 is arranged at the end of the calender 19 (as seen in the conveying direction).

The pair of nip rollers 29 is fed by an extruder 32, the dimensions of the die 33 of which match the form of the rollers 30 and 31.

The pair of nip rollers 29 is followed by a draw-off roller assembly 34 consisting of the rollers 35, 36 and 37. The cooling-roller and smoothing-roller calender 19, together with the draw-off roller assembly 34, forms a rolling arrangement 39.

The light cover is produced in the following steps on the apparatus described above:

A plastic, for example polystyrene, is mixed with a blowing agent, for example azodicarbonamide, and is fed to the calender 19 via the extruder 26 and the sheet die 28. The extruded plastic is rolled out into a sheet-like structure with a thickness of approximately 0.5 to 0.8 mm. During this operation (calendering out), the temperature of the extruded plastic remains below the glass transition point, and fine flat irregular closed-pore bubbles 14 form. These bubbles 14 have a shape differing from that of a sphere, this being caused by the rolling operation. The bubbles 14 are aligned in the rolling direction and have a height less than their width. The height of the bubbles 14 marks their extension parallel to the sheet-like structure.

The intermediate product after calendering and after the formation of the bubbles is the light distribution layer 11. After it has passed the last roller 25 of the calender 19, the light distribution layer 11 is fed to the pair of nip rollers 29. The die 33 arranged above the latter supplies supertransparent polystyrene to the pair of nip rollers 29. During passage through a nip 38 between the rollers 30 and 31, an intimate connection is made between the extruded plastic and the light distribution layer 11 supplied via the roller 31. During this, the temperature of the light distribution layer 11 is below the glass temperature.

On the draw-off roller assembly 34, the web now consisting of two layers is cooled further and the connection between the two layers is reinforced. The layer now located on the light distribution layer 11 is the carrier layer 12. The roller 30 is profiled or roughened in order to obtain a special surface effect on the carrier layer. The profile depth in the surface 13 of the carrier layer 12, obtained by means of the roller 30, is approximately 0.5 to 2.5 mm.

In a further process step, the web which here consists of two layers is divided and shaped according to the dimensions of a final product, for example a lamp bowl. Shaping is carried out, for example, by means of deep-drawing.

We claim:

1. Light cover (10), especially a plate-shaped or bowl-shaped lamp cover made of transparent material, comprising:

at least one rigid light-transmitting, supertransparent carrier layer (12);

at least one foamed, light-transmitting light distribution layer (11);

said light-distribution layer (11) and said carrier layer (12) being firmly joined to one another; and said light distribution layer (11) containing a plurality of bubbles (14), and characterized in that the carrier layer (12) is roughened or profiled on its surface (13) facing away from the light source.

2. Light cover (10), especially a plate-shaped or bowl-shaped lamp cover made of transparent material, comprising:

at least one rigid light-transmitting, supertransparent carrier layer (12);

at least one foamed, light-transmitting light distribution layer (11);

said light-distribution layer (11) and said carrier layer (12) being firmly joined to one another; and said light distribution layer (11) containing a plurality of bubbles (14), and characterized in that the bubbles (14) in the light-distribution layer (11) are made elongate and flat, and in that the bubbles (14) have a length of 0.5 to 2.0 mm, a width of 0.1 to 0.3 mm and an average height of approximately 0.05 mm.

3. Light cover (10), especially a plate-shaped or bowl-shaped lamp cover made of transparent material, comprising:

at least one rigid light-transmitting, supertransparent carrier layer (12);

at least one foamed, light-transmitting light distribution layer (11);

said light-distribution layer (11) and said carrier layer (12) being firmly joined to one another; and said light distribution layer (11) containing a plurality of bubbles (14), and wherein the bubbles (14) are located in the light-distribution layer (11) in a middle region thereof between outer faces (15, 16) of the light-distribution layer (11), and wherein each of regions (17, 18), adjacent to said outer faces (15, 16), has a thickness of 0.05 to 0.1 mm and is virtually bubble-free.

4. Light cover according to claim 3, wherein said light distribution layer (11) is thinner than said carrier layer (12), and the light-distribution layer (11) is arranged on the side of the carrier layer facing a light source (40).

5. Light cover (10) according to claims 3 or 4, characterized in that at least the carrier layer (12) consists of transparent polystyrene.

6. Light cover (10), especially a plate-shaped or bowl-shaped lamp cover made of transparent material, characterized by at least one layer of light-transmitting foamed material, and by several layers which are joined firmly to one another and of which at least one is designed as a carrier layer (12) consisting of rigid light-transmitting, especially supertransparent material and at least one other is designed as a foamed light distribution layer (11); and further characterized in that the carrier layer (12) is roughened or profiled on its surface (13) facing away from the light source.

7. Light cover (10), especially a plate-shaped or bowl-shaped lamp cover made of transparent material, characterized by at least one layer of light-transmitting foamed material, and by several layers which are joined firmly to one another and of which at least one is designed as a carrier layer (12) consisting of rigid light-transmitting, especially supertransparent material and at least one other is designed as a foamed light distribution layer (11); and further characterized in that the light distribution layer (11) has a plurality of bubbles (14) in the middle region between its outer faces (15, 16), and the regions (17, 18) adjacent to the outer faces (15, 16) are made virtually bubble-free and each with a thickness of 0.05 to 0.1 mm.

8. Light cover (10) according to claim 7, characterized in that the bubbles (14) in the light distribution layer (11) are made elongate and flat, and in that the bubbles (14) have a length of 0.5 to 2.0 mm, a width of 0.1 to 0.3 mm and an average height of approximately 0.05 mm.

9. Light cover (10) according to claim 7, characterized in that the light distribution layer (11) has a thickness of 0.05 to 0.8 mm.

10. Light cover (10) according to claim 7, characterized in that the light distribution layer (11) consists of foamed polystyrene.

11. Light cover (10) according to claim 7, characterized in that the carrier layer (12) is arranged on the side facing away from a light source (40), and the light distribution layer (11) is arranged on the side facing the light source (40).

12. Light cover (10) according to claims 7 or 6, characterized in that at least the carrier layer (12) consists of transparent polystyrene.

13. Light cover (10) according to claim 10, characterized by a total thickness of approximately 3 to 6 mm.

* * * * *